US012783213B2

(12) United States Patent
Kang et al.

(10) Patent No.: US 12,783,213 B2
(45) Date of Patent: Nov. 3, 2026

(54) SYSTEM AND METHOD FOR PROVIDING A PROGRAMMING FRAMEWORK FOR DESIGNING HIGH-PERFORMANCE NON-VOLATILE MEMORY OBJECTS WITH HIGH USABILITY

(71) Applicant: Korea Advanced Institute of Science and Technology, Daejeon (KR)

(72) Inventors: Jeehoon Kang, Daejeon (KR); Seungmin Jeon, Daejeon (KR); Kyeongmin Cho, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 250 days.

(21) Appl. No.: 18/383,952

(22) Filed: Oct. 26, 2023

(65) Prior Publication Data

US 2024/0160411 A1 May 16, 2024

(30) Foreign Application Priority Data

Nov. 8, 2022 (KR) ........................ 10-2022-0147444
Jul. 17, 2023 (KR) ........................ 10-2023-0092573

(51) Int. Cl.
*G06F 8/20* (2018.01)

(52) U.S. Cl.
CPC ...................................... *G06F 8/20* (2013.01)

(58) Field of Classification Search
None
See application file for complete search history.

(56) References Cited

U.S. PATENT DOCUMENTS

2014/0067761 A1* 3/2014 Chakrabarti ........ G06F 11/1471 707/634
2016/0314044 A1* 10/2016 Marathe .............. G06F 11/1471
2019/0258508 A1* 8/2019 Marathe .............. G06F 11/1446
2020/0142829 A1* 5/2020 Wang ...................... G06F 9/467

OTHER PUBLICATIONS

H. Attiya, O. Ben-Baruch, P. Fatourou, D. Hendler & E. Kosmas, “Tracking in Order to Recover: Detectable Recovery of Lock-Free Data Structures,” arXiv:1905.13600v2, Jul. 27, 2021. (Year: 2021).*

S.K. Lee, J. Mohan, S. Kashyap, T. Kim & V. Chidambaram, “Recipe: Converting Concurrent DRAM Indexes to Persistent-Memory Indexes,” arXiv:1909.13670v4, Nov. 8, 2019. (Year: 2019).*

Kyeongmin Cho et al., “Practical Detectability for Persistent Lock-Free Data Structures” Mar. 15, 2022, https://arxiv.org/abs/2203.07621.

Kyeongmin Cho et al., “Revamping Hardware Persistency Models: View-Based and Axiomatic Persistency Models for Intel-x86 and Armv8.” In Proceedings of the 42nd ACM SIGPLAN International Conference on Programming Language Design and Implementation (PLDI ’21), Jun. 20-25, 2021, Virtual, Canada. ACM, New York, NY, USA, 16 pages. https://doi.org/10.1145/3453483.3454027.

* cited by examiner

*Primary Examiner* — Andrew M. Lyons
(74) *Attorney, Agent, or Firm* — Young Basile Hanlon & MacFarlane, P.C.

(57) ABSTRACT

Disclosed is a programming framework providing system and method that may design a high-performance non-volatile memory object with high usability. An object design method of a non-volatile memory performed by a non-volatile memory object design system includes designing a type system for a deterministic replay and a detectable operation using persistent memory (PM) language; and implementing a data structure (DS) of the PM based on the designed type system.

9 Claims, 11 Drawing Sheets

Algorithm 1 Transfer from a saving account to a current account with mementos

```
function TRANSFER(savings, current, amount, [mid])            ▷ mid: memento id
    succ ← WITHDRAW(savings, amount, [mid.withdraw]):
    if succ then DEPOSIT(current, amount, [mid.desposit])
end function
```

FIG. 1

Algorithm 2 Insertion on the harris concurrent sorted linked-list

```
function INSERT(head, val, [mid])
    loop
        (prev,next,blk) ← [chkpt(λ.] e_pnb, [mid.pnb]);     ▷ timestamp: 30|80
        succ ← [p]cas(prev.next, next, blk, [mid.cas]);     ▷ timestamp: 20|90
        if succ then return
    end loop
end function
e_pnb ≜ (p,n) ← FIND(head, val);b ← palloc(<val : val; next : n>); return (p,n, b)
```

FIG. 2

Algorithm 3 Resizing the Clevel hash table (simplified)

```
function ResizeMoveArray(from, to, mid)
    loop
        i ← chkpt(λ.o(∅, i+1), mid.i)                    ▷ timestamp: 30|80
        if i ≥ |from| then return
        ResizeMoveEntry(from, i, to, mid.entry)          ▷ timestamp: 20|90
    end loop
end function
```

FIG. 3

| | | |
|---|---|---|
| $p ::= [\delta]\ \vec{s_1} \parallel \ldots \parallel \vec{s_n}$ | | *program* |
| $s \in \text{Stmt} ::= r \leftarrow e \mid r \leftarrow \texttt{pload}(e) \mid r \leftarrow \texttt{palloc}(e)$ | | *assignment & PM* |
| $\mid \texttt{if}\ (e)\ \vec{s_t}\ \vec{s_f} \mid \texttt{loop}\ r\ e\ \vec{s} \mid \texttt{continue}\ e \mid \texttt{break}$ | | *control constructs* |
| $\mid r \leftarrow f(\vec{e}) \mid \texttt{return}\ e$ | | *function call/return* |
| $\mid r \leftarrow \texttt{chkpt}(\vec{s}, e_{mid}) \mid r \leftarrow \texttt{pcas}(e_{loc}, e_{old}, e_{new}, e_{mid})$ | | *detectable op.* |
| $e \in \text{Expr} ::= () \mid z \mid b \mid mid \mid r \mid (e_1\ op\ e_2) \mid e.i \mid (e_1, e_2) \mid \texttt{inl}\ e \mid \texttt{inr}\ e$ | | *pure expr.* |
| $\mid \texttt{match}\ e\ \{\ \texttt{inl}\ e_l \Rightarrow e_l',\ \texttt{inr}\ e_r \Rightarrow e_r'\} \mid \epsilon \mid e.lab \mid \ldots$ | | |
| $v \in \text{Val} ::= () \mid z \mid b \mid mid \mid (v_1, v_2) \mid \texttt{inl}\ v \mid \texttt{inr}\ v$ | | *value* |

$z \in \mathbb{Z} \qquad b \in \mathbb{B} \qquad op \in \text{Op} \qquad r \in \text{VReg} \triangleq \mathbb{N} \qquad \sigma \in \text{VRegMap} \triangleq \text{VReg} \rightharpoonup \text{Val}$ $f \in \text{FnId} \qquad \delta \in \text{Env} \triangleq \text{FnId} \rightharpoonup (\overrightarrow{\text{VReg}} \times \overrightarrow{\text{Stmt}}) \qquad l \in \text{PLoc} \triangleq \mathbb{N} \qquad lab \in \text{Label} \qquad mid \in \overrightarrow{\text{Label}}$ $t \in \text{Time} \triangleq \mathbb{N} \qquad tid \in \text{TId} \triangleq \mathbb{N} \qquad mmts \in \text{Mmts} \triangleq \overrightarrow{\text{Label}} \rightharpoonup \langle \text{val}:\text{Val}; \text{time}:\text{Time}\rangle$ $c \in \text{Cont} \qquad ts \in \text{TState} \triangleq \langle regs : \text{VRegMap}; \text{time}:\text{Time}\rangle \qquad T \in \text{Thread} \triangleq \overrightarrow{\text{Stmt}} \times \overrightarrow{\text{Cont}} \times \text{TState} \times \text{Mmts}$ $ev \in \text{Event} ::= \text{R}(l, v) \mid \text{U}(l, v_{old}, v_{new}) \qquad tr \in \overrightarrow{\text{Event}} \qquad mem \in \text{Mem} \qquad M \in \text{Machine} \triangleq \overrightarrow{\text{Thread}} \times \text{Mem}$ $\boxed{\vec{s_1}, \vec{c_1}, ts_1, mmts_1 \xrightarrow{tr}_{\delta} \vec{s_2}, \vec{c_2}, ts_2, mmts_2} \qquad \boxed{mem_1 \xrightarrow{tr} mem_2} \qquad \boxed{M_1 \xrightarrow{tr}_{p} M_2}$ (MACHINE-STEP)

$$\frac{\mathcal{T}_1[tid] = (\vec{s_1}, \vec{c_1}, ts_1, mmts_1) \quad \mathcal{T}_2 = \mathcal{T}_1[tid \mapsto (\vec{s_2}, \vec{c_2}, ts_2, mmts_2)] \quad \vec{s_1}, \vec{c_1}, ts_1, mmts_1 \xrightarrow{tr}_{p.\delta} \vec{s_2}, \vec{c_2}, ts_2, mmts_2 \quad mem_1 \xrightarrow{tr} mem_2}{(\mathcal{T}_1, mem_1) \xrightarrow{tr|_{\mathbb{E}}}_{p} (\mathcal{T}_2, mem_2)}$$

(MACHINE-CRASH)

$$\frac{\mathcal{T}_1[tid] = (\vec{s_1}, \vec{c_1}, ts_1, mmts_1) \quad \mathcal{T}_2 = \mathcal{T}_1[tid \mapsto (\overrightarrow{p.s_{tid}}, [], ts_{init}, mmts_1)]}{(\mathcal{T}_1, mem) \xrightarrow{[]}_{p} (\mathcal{T}_2, mem)}$$

FIG. 4

$labs \in \mathcal{P}(\text{Label})$ $\quad$ $\text{FnType} ::= \text{RO} \mid \text{RW}$ $\Delta \in \text{EnvType} \triangleq \text{FnId} \rightarrow \text{FnType}$ $\boxed{\vdash p}$

(PROGRAM)

$$\frac{\vdash \delta : \Delta \qquad \Delta \vdash_{labs_{tid}} \overrightarrow{s_{tid}} \quad \text{for each } tid}{\vdash [\delta]\ \vec{s_1} \parallel \ldots \parallel \vec{s_n}}$$

$\boxed{\vdash \delta : \Delta}$

(ENV-EMPTY)

$$\frac{}{\vdash\ : []}$$

(ENV-RO)

$$\frac{\vdash \delta : \Delta \qquad \Delta \vdash_{\text{RO}} \vec{s}}{\vdash \delta[f \mapsto (\overrightarrow{prms}, \vec{s})] : \Delta[f \mapsto \text{RO}]}$$

(ENV-RW)

$$\frac{\vdash \delta : \Delta \qquad \Delta \vdash_{labs} \vec{s} \qquad \overrightarrow{prms_{\text{all}}} = \overrightarrow{prms} + \{\text{mid}\}}{\vdash \delta[f \mapsto (\overrightarrow{prms_{\text{all}}}, \vec{s})] : \Delta[f \mapsto \text{RW}]}$$

$\boxed{\Delta \vdash_{labs} \vec{s}}$

(EMPTY)

$$\frac{}{\Delta \vdash_{\emptyset} []}$$

(ASSIGN)

$$\frac{}{\Delta \vdash_{\emptyset} [r \leftarrow e]}$$

(CAS)

$$\frac{}{\Delta \vdash_{\{lab\}} [r \leftarrow \text{pcas}(e_l, e_o, e_n, \text{mid}.lab)]}$$

(CHKPT)

$$\frac{\Delta \vdash_{\text{RO}} \vec{s}}{\Delta \vdash_{\{lab\}} [r \leftarrow \text{chkpt}(\vec{s}, \text{mid}.lab)]}$$

(SEQ)

$$\frac{labs_l \cap labs_r = \emptyset \qquad \Delta \vdash_{labs_l} \vec{s_l} \qquad \Delta \vdash_{labs_r} \vec{s_r}}{\Delta \vdash_{labs_l \uplus labs_r} \vec{s_l} + \vec{s_r}}$$

(IF-THEN-ELSE)

$$\frac{\Delta \vdash_{labs_t} \vec{s_t} \qquad \Delta \vdash_{labs_f} \vec{s_f}}{\Delta \vdash_{labs_t \cup labs_f} [\text{if } (e)\ \vec{s_t}\ \vec{s_f}]}$$

(LOOP-SIMPLE)

$$\frac{\Delta \vdash_{labs} \vec{s}}{\Delta \vdash_{labs} [\text{loop}\ \_\ ()\ \vec{s}]}$$

(LOOP)

$$\frac{\Delta \vdash_{labs} \vec{s} \qquad lab \notin labs}{\Delta \vdash_{\{lab\} \uplus labs} [\text{loop}\ r\ e\ ((r \leftarrow \text{chkpt}([\text{return}\ r], \text{mid}.lab)) :: \vec{s})]}$$

(CONTINUE)

$$\frac{}{\Delta \vdash_{\emptyset} [\text{continue}\ e]}$$

(BREAK)

$$\frac{}{\Delta \vdash_{\emptyset} [\text{break}]}$$

(CALL)

$$\frac{\Delta(f) = \text{RW}}{\Delta \vdash_{\{lab\}} [r \leftarrow f(\vec{e} + \{\text{mid}.lab\})]}$$

(RETURN)

$$\frac{}{\Delta \vdash_{\emptyset} [\text{return}\ e]}$$

FIG. 5

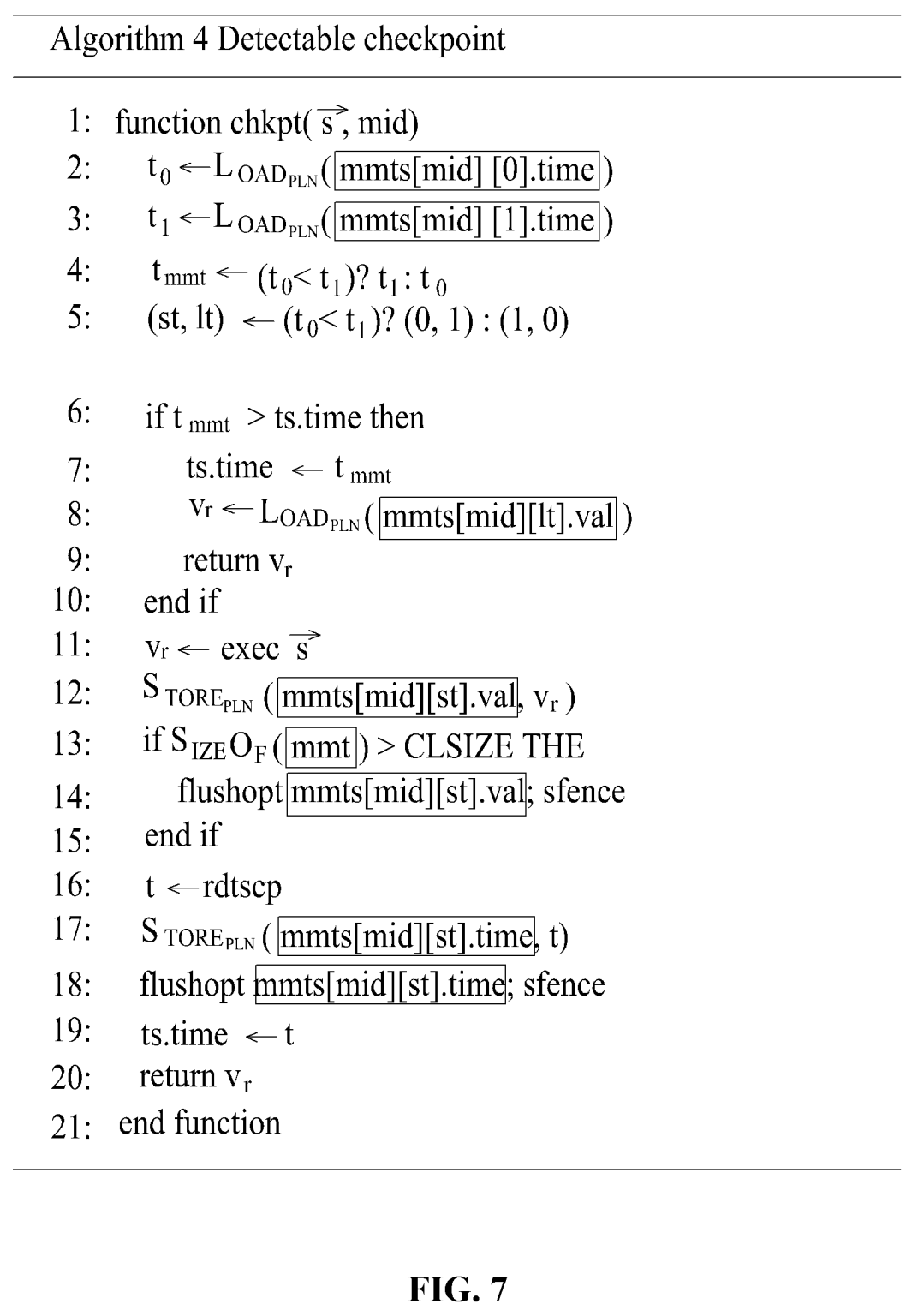

Algorithm 4 Detectable checkpoint

```
function chkpt(s⃗, mid)
    t_0 ← LOAD_PLN([mmts[mid] [0].time])
    t_1 ← LOAD_PLN([mmts[mid] [1].time])
    t_mmt ← (t_0 < t_1)? t_1 : t_0
    (st, lt) ← (t_0 < t_1)? (0, 1) : (1, 0)

    if t_mmt > ts.time then
        ts.time ← t_mmt
        v_r ← LOAD_PLN([mmts[mid][lt].val])
        return v_r
    end if
    v_r ← exec s⃗
    STORE_PLN([mmts[mid][st].val], v_r)
    if SIZEOF([mmt]) > CLSIZE THE
        flushopt [mmts[mid][st].val]; sfence
    end if
    t ← rdtscp
    STORE_PLN([mmts[mid][st].time], t)
    flushopt [mmts[mid][st].time]; sfence
    ts.time ← t
    return v_r
end function
```

FIG. 7

Algorithm 5 Load and detectable CAS for location values

```
1:  function pload(loc)                          ▷ for location values
2:      cur ⟵ LOAD_PLN (loc)
3:      return HELP (loc, cur)
4:  end function
5:  function pcas(loc, old, new, mid)
6:      t_0 ⟵ LOAD_PLN ([mmts[mid][0].time])
7:      t_1 ⟵ LOAD_PLN ([mmts[mid][1].time])
8:      t_mmt     (t_0 < t_1) ? t_1 : t_0
9:      (st, lt)  ⟵ (t_0 < t_1) ? (0,1) : (1,0)
10:     pst_mmt ⟵ LOAD_PLN ([mmts[mid][lt].time])
11:     (par_mmt, suc_mmt, t_mmt) ⟵ DECODET( pst_mmt )
12:     if t_mmt > ts.time then
13:         ts.time ⟵ t_mmt
14:         if suc_mmt then return (true, old)
15:         V_r ⟵ LOAD_PLN([mmts[mid][lt].val])
16:         return (false, v_r)
17:     end if
18:     _ ⟵ pload(loc)
19:     (par_ow, - , t_own ) ⟵ DECODET(ts.cas)
20:     t_help ⟵ LOAD_PLN([HELP[¬par_own ][tid]])
21:     if t_own < t_help then
43:         flushopt loc;sfence
44:         ts.time ⟵ t
45:         pst_suc ⟵ ENCODET (¬par_own , true, t)
46:         ts.cas ⟵ pst_suc
47:         STORE_PLN ([mmts[mid][st].time], pst_suc )
48:         flushopt [mmts[mid][st].time]
49:         new" ⟵ ENCODE (EVEN, false, 0, new)
50:         r_2 ⟵ CAS_PLN (loc, new', new")
51:         if r_2 is ERR then sfence
52:         return (true, old)
53: end function
54: function HELP (loc, old)
55:     (par_old, dsc_old, tid_old, o_old) ⟵ DECODE(old)
56:     if tid_old = 0 then return o_old
57:     wait(O_g)
58:     t ⟵ rdtcp; lfence
59:     wait(O_g)
60:     cur ⟵ LOAD_PLN(loc)
61:     if old ≠ cur then old ⟵ cur;goto 55
62:     flushopt loc
63:     r_dse ⟵ REGISTER DESC (loc,old)
```

FIG. 8A

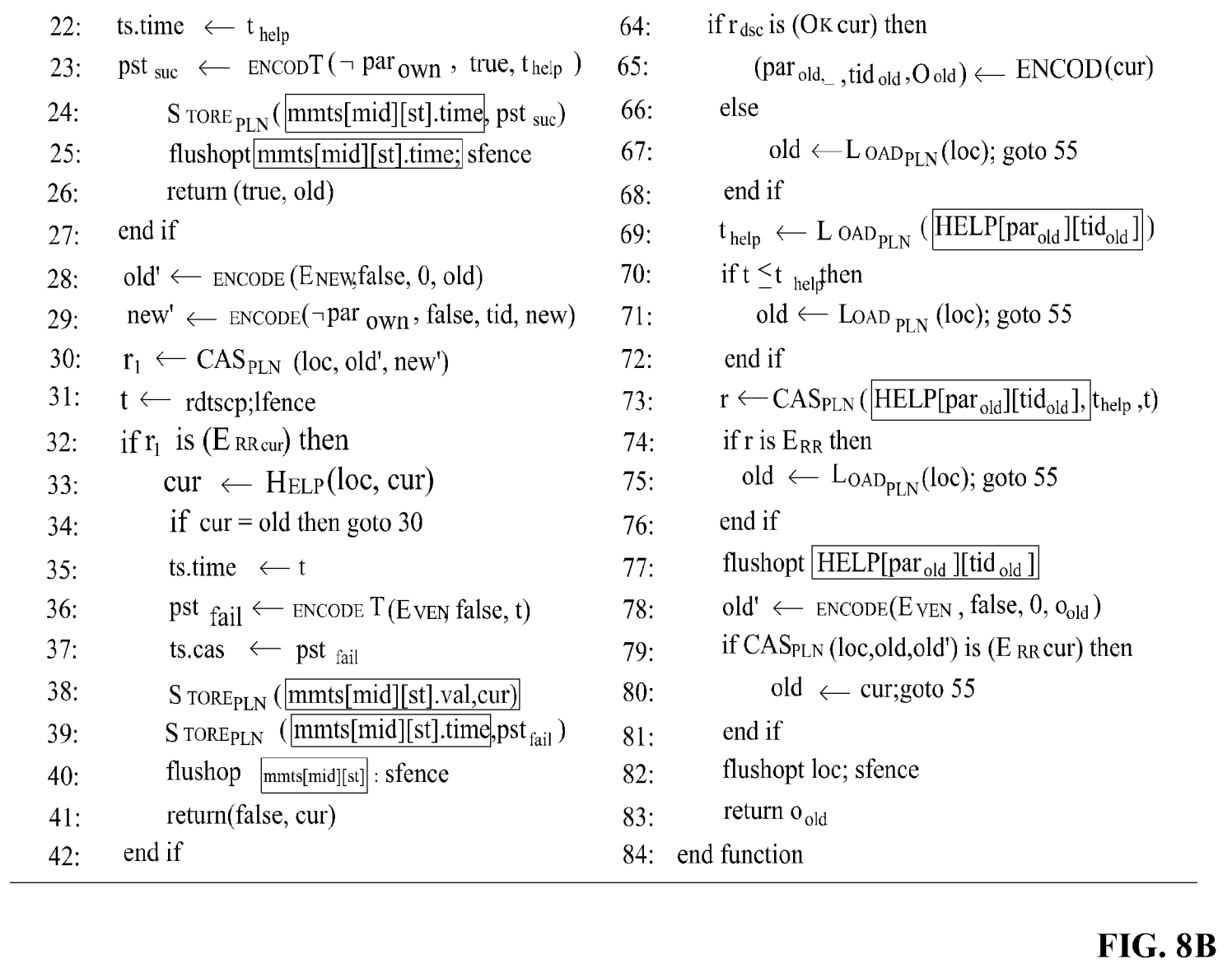

```
ts.time ← t_help
pst_suc ← ENCODT(¬par_own , true, t_help )
    STORE_PLN(mmts[mid][st].time, pst_suc)
    flushopt mmts[mid][st].time; sfence
    return (true, old)
end if
old' ← ENCODE(E_NEW, false, 0, old)
new' ← ENCODE(¬par_own , false, tid, new)
r_1 ← CAS_PLN (loc, old', new')
t ← rdtscp;lfence
if r_1 is (E_RR cur) then
    cur ← HELP(loc, cur)
    if cur = old then goto 30
    ts.time ← t
    pst_fail ← ENCODE T(E_VEN, false, t)
    ts.cas ← pst_fail
    STORE_PLN (mmts[mid][st].val,cur)
    STORE_PLN (mmts[mid][st].time,pst_fail )
    flushop mmts[mid][st] : sfence
    return(false, cur)
end if
```

```
if r_dsc is (OK cur) then
    (par_old,_ ,tid_old ,O_old) ← ENCOD(cur)
else
    old ← LOAD_PLN(loc); goto 55
end if
t_help ← LOAD_PLN (HELP[par_old][tid_old])
if t ≤ t_help then
    old ← LOAD_PLN (loc); goto 55
end if
r ← CAS_PLN (HELP[par_old][tid_old], t_help ,t)
if r is E_RR then
    old ← LOAD_PLN(loc); goto 55
end if
flushopt HELP[par_old ][tid_old ]
old' ← ENCODE(E_VEN , false, 0, o_old)
if CAS_PLN (loc,old,old') is (E_RR cur) then
    old ← cur;goto 55
end if
flushopt loc; sfence
return o_old
end function
```

FIG. 8B

SYSTEM AND METHOD FOR PROVIDING A PROGRAMMING FRAMEWORK FOR DESIGNING HIGH-PERFORMANCE NON-VOLATILE MEMORY OBJECTS WITH HIGH USABILITY

CROSS-REFERENCE TO RELATED APPLICATION(S)

This application claims the priority benefits of Korean Patent Application No. 10-2022-0147444, filed on Nov. 8, 2022 and Korean Patent Application No. 10-2023-0092573, filed on Jul. 17, 2023, in the Korean Intellectual Property Office, the disclosure of which is incorporated herein by reference.

BACKGROUND

1. Field of the Invention

Example embodiments relate to technology for designing a non-volatile memory object.

2. Description of the Related Art

Persistent memory (PM) refers to a new type of storage technology that combines performance of dynamic random access memory (DRAM) with durability of solid state drive (SSD), providing their own advantages. This leads to a surge of research on persistent objects in PM. Among such persistent objects, data structure (DS) is drawing attraction due to its own performance and scalability.

One of the most widely used correctness criteria for persistent data structure (DS) is detectable recoverability, which ensures both thread safety (for correctness in non-crashing concurrent executions) and crash consistency (for correctness in crashing executions).

However, the existing approach to designing a detectably recoverable concurrent data structure (DS) is limited to a simple algorithm or suffers from high runtime overhead.

SUMMARY

Example embodiments may provide a general and high-performance programming framework for detectably recoverable concurrent data structure (DS) in persistent memory (PM).

According to an aspect of at least one example embodiment, there is provided an object design method of a non-volatile memory performed by a non-volatile memory object design system, the method including designing a type system for a deterministic replay and a detectable operation using persistent memory (PM) language; and implementing a data structure (DS) of the PM based on the designed type system.

The designing may include providing a detectable checkpoint operation that records a result of read-only expression, and the checkpoint operation may verify whether a value is recorded in memento mid and if the value is not recorded in the memento mid, may record a result obtained by executing the read-only expression in the memento mid and may return the result.

The designing may include providing a detectable, persistent compare-and-swap (CAS) operation, and the CAS operation may compare a current value of loc against void and if the values match, may update the same to $v_{new}$, and if the values do not match, may not change the current value of loc.

The designing may include additionally setting an operation descriptor that records a progress status and result of an operation in the PM.

The designing may include supporting a loop by efficiently distinguishing results of sub-operation from different iterations using timestamps and by recording an operation progress status.

The designing may include supporting loop-carried dependence through checkpoint of dependent variables at a loop head, and in the case of presence of multiple dependent variables at the loop head, merging all the variables into a single tuple or struct and checkpointing the same at once.

The implementing may include accessing PM locations with byte addressability through load, store, and CAS instructions.

The implementing may include implementing in a DS of PM by adjusting a DS of volatile memory based on the designed type system, and the DS of the PS may include a CAS-based lock-free linked-list, a CAS-based Treiber stack, CAS-based Michael-Scott queue, Michael-Scott queue based on Indel-mmt and Vol-mmt, combining queue based on Comb-mmt, and a CAS-based lock-free resizing hash table.

According to an aspect of at least one example embodiment, there is provided a non-transitory computer-readable recording medium storing instructions that, when executed by a processor, cause the processor to execute an object design method of a non-volatile memory performed by a non-volatile memory object design system, wherein the object design method includes designing a type system for a deterministic replay and a detectable operation using PM language; and implementing a DS of the PM based on the designed type system.

According to an aspect of at least one example embodiment, there is provided a non-volatile memory object design system including a type system design unit configured to design a type system for a deterministic replay and a detectable operation using PM language; and a DS implementation unit configured to implement a DS of the PM based on the designed type system.

According to example embodiments, it is possible to help a programmer easily uses PM by providing basic operations of efficiently operating with a type system that ensures safety by providing a framework that safely and efficiently designs a program in PM.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 1 is an example for explaining a transfer operation of a banking example according to an example embodiment;

FIG. 2 is an example for explaining a concurrent linked-list according to an example embodiment;

FIG. 3 is an example for explaining a ResizeMoveArray operation in a Clevel hash table according to an example embodiment;

FIG. 4 is an example for explaining syntax and semantics of core persistent memory (PM) language according to an example embodiment;

FIG. 5 is an example for explaining a type system for a deterministic replay and a detectable operation according to an example embodiment;

FIG. 7 is an example for explaining detectable checkpoint according to an example embodiment;

FIG. 8A-B is an example for explaining an operation of implementing pcas according to an example embodiment;

DETAILED DESCRIPTION

Figure 6:
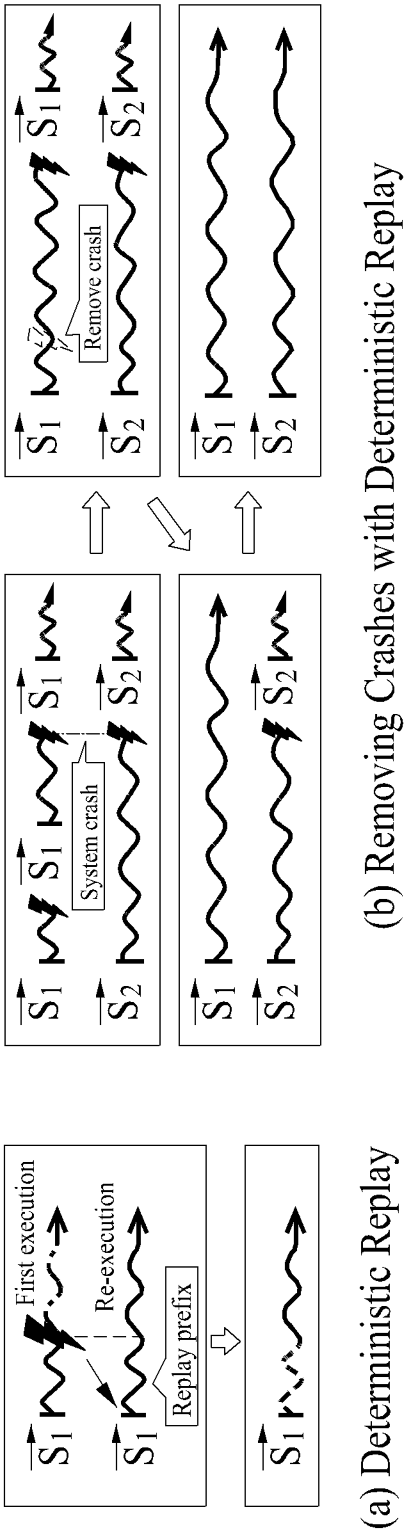
FIG. 6 illustrates an example for explaining an operation of proving detectability by gradually removing crashes according to an example embodiment.

Hereinafter, example embodiments will be described with reference to the accompanying drawings.

FIG. 1 is an example for explaining a transfer operation of a banking example according to an example embodiment.

A non-volatile memory object design system may provide a general and high-performance programming framework for detectably recoverable concurrent data structure (DS) in persistent memory (PM). The non-volatile memory object design system may transform a volatile data structure (DS) to a persistent DS by assembling a DS through memento. The non-volatile memory object design system may achieve detectability by deterministically replaying a program after a crash through memento. Before presenting a type system that statically ensures a deterministic replay, a progress status and result of the program may be recorded using a memento that is a thread-private log stored in PM (here, framework name).

The non-volatile memory object design system may ensure a deterministic replay of a constructed operation. A transfer operation of banking example shown in Algorithm 1 is described as an example with reference to FIG. 1. The non-volatile memory object design system attempts to withdraw an amount from a savings account (savings) (L2) and if it succeeds, deposits the same amount into a current account (current) (L3). A code without a highlighted part is correct on volatile memory but not recoverable on persistent memory (PM) if a crash occurs. To ensure the previous deterministic replay, the non-volatile memory object design system suffices to ensure withdraw and deposit that are its sub-operations using mid.withdraw and mid.deposit, respectively. Regardless of whether execution of a function $f$ is completed or interrupted at crash time, post-crash re-execution of $f$ will return the same result or resume from an interrupted program point, respectively, due to its memento. For example, if pre-crash execution crashes at L2, the post-crash re-execution may resume withdraw due to its deterministic replay. On the other hand, if the pre-crash execution crashes during deposit at L3, the post-crash re-execution may produce the same result succ from withdraw, may take the same branch, and may resume deposit. In general, the deterministic replay property is preserved by sequential composition and condition.

The non-volatile memory object design system may implement a checkpoint operation using a timestamp. A checkpoint primitive is described. The non-volatile memory object design system may provide a detectable checkpoint operation that records the result of read-only expression as a general-purpose primitive operation.

$$1: 0 \leftarrow chkpt(\lambda, e, mid) \triangleright e\text{: read-only}$$

Here, e is a read-only expression whose result may change in the case of a crash due to, for example, concurrent modification to PM. The checkpoint operation initially verifies if a value is recorded in the memento mid, and if so, the checkpoint operation returns its value; otherwise, the checkpoint executes e, records its result in the memento mid and returns the result. The checkpoint operation is detectable. Although the checkpoint operation may partially execute e several times across crashes (hence, e needs to be read-only), the checkpoint operation may produce a unique result that is recorded in the memento across crashes and may assign this unique result to v.

A PM allocation is considered read-only as its effect is thread-local and becomes visible to other threads only after an address is published to shared memory. Since an underlying memory allocator is assumed to trace garbage after a crash, it is safe to leak the PM allocation during the crash.

Subsequently, a compare-and-swap (CAS) primitive is described. As another general-purpose primitive operation for concurrent programming, the non-volatile memory object design system may provide a detectable, persistent compare-and-swap (CAS) operation.

$$1: r \leftarrow pcas(loc, v_{old}, v_{new}, mid)$$

The CAS operation compares a current value of loc and a value of $v_{old}$, if the values match, may update the same to $v_{new}$. Otherwise, the value of loc does not change. A return value $r \in \mathbb{B} \times Val$ is a pair that includes a Boolean flag reflecting whether the update is successful and an original value held in loc. The CAS operation may guarantee that the result r is deterministic as long as arguments are also deterministic. In particular, if pcas is unsuccessful before a crash, the failure may be recorded in the memento mid and thus, a post-crash execution may also fail by inspecting mid.

The deterministic replay may not be achieved using a plain CAS operation. If a crash occurs, information, such as whether the plain CAS is performed, and if it is successful, is lost. The pcas requires additional synchronization in PM. The non-volatile memory object design system may use only 8 persistent memory bytes for each location.

The non-volatile memory object design system may support a simple loop using a timestamp. Since the banking example uses a unique sub-memento for each sub-operation, it may make it easier to ensure a deterministic replay of a constructed operation. While it is feasible for a simple program, the unique memento assumption does not apply to a complex program with a loop as sub-mementos are reused across different loop iterations. To support a loop, the non-volatile memory object design system may use a timestamp.

FIG. 2 is an example for explaining a concurrent linked-list according to an example embodiment.

An insert operation on a concurrent sorted linked-list in Algorithm 2 is considered. For brevity, implementation of function Find(head, val) (traversing the list from head to find val) and deallocation of a non-inserted block may be omitted. As before, a code without a highlighted part is suitable for volatile memory. Here, adjacent blocks, prey and next, between which val is inserted are found while preserving the sorted order and allocates a new block, blk, that includes val and points may be allocated to next (L3). A CAS may be performed on prev.next from next to blk (L4) and attempt may be continuously made until it succeeds (L5).

Adding the highlighted part (replacing cas with pcas at L4), a programmer may ensure a deterministic replay of a loop body. However, it is insufficient to correctly recover from a crash after a loop iteration as a memento is reused. An execution that crashes right after L3 in a second loop iteration is considered. After the crash, mid.pnb may include the result of $e_{pnb}$ in the second iteration, while mid.cas may include the result of the CAS in the first iteration. Therefore, it is necessary to distinguish results of sub-operations from different iterations for correct recovery; otherwise, a post-crash execution may be mixed with the sub-operation result.

The non-volatile memory object design system may additionally set an operation descriptor to record a progress status and result of an operation in PM. To address the challenge of loops and, more generally, of complex control flow, a prior work may perform additional write and following flush to PM to record the operation progress.

To efficiently distinguish between sub-operation results of different iterations and to more generally record the operation progress status, the non-volatile memory object design system may use a timestamp. The timestamp is a counter that monotonically increases during an execution and in the case of a crash. Specifically, each primitive detectable sub-operation additionally records in its sub-memento a timestamp at which it completes. In the above scenario, the sub-operation may record timestamps of 10 and 20 in mid.pnb and mid.cas in the first loop iteration, respectively, and then, may overwrite a timestamp of 30 in mid.pnb in a next iteration.

In the post-crash execution, the non-volatile memory object design system may observe that timestamp 30 in mid.pnb and then 20 in mid.cas, which is not monotonically increasing with the control flow. That is, checkpoint at L3 is performed in the last iteration before the crash, but pcas at L4 is not performed. Therefore, the post-crash execution may resume at L4 and re-execute pcas.

Regardless of a program point at which execution crashes, the post-crash execution may deterministically replay the last iteration before the crash. It is assumed that timestamps recorded in mid.pnb and mid.cas are 80 and 90, respectively. Then, the post-crash execution may replay the last iteration by observing the monotonically increasing timestamps (80 at L3 and 90 at L4) and may retrieve the recorded result. Thereafter, it will either successfully return or try again (L5).

The non-volatile memory object design system does not generate additional write and flush to PM. Meanwhile, a primitive operation, checkpoint, and CAS record a timestamp and a result of an operation at a time. On the other hand, the non-volatile memory object design system does not require additional write and flush for a loop and other control structures.

The non-volatile memory object design system may support loop-carried dependence through dependent variable checkpoint. In the presence of loop-carried dependence, a timestamp alone does not guarantee a deterministic replay since a dependent variable value may be lost in case of a crash. As such, the non-volatile memory object design system may further request a programmer to checkpoint dependent variables for each iteration.

FIG. 3 is an example for explaining a ResizeMoveArray operation in a Clevel hash table according to an example embodiment.

When resizing a hash table, every entry in an array of an old level, "from," is moved to an array of a new level, "to". To do this, an operation iterates from (L3) and may invoke a sub-operation ResizeMoveEntry for each entry index i (for brevity, ResizeMoveEntry is omitted). To explicitly reveal loop-carried dependence, the non-volatile memory object design system may represent a code in a static single assignment (SSA) form. In the SSA form, loop-dependent variables may be defined as a ϕ-node at the beginning of the loop. A ϕ-node in the form $V=\phi(v_0, v_1)$ may assign v0 (resp. v1) to v in the case of the first (resp. a later) iteration. Similarly, the ϕ-node in the form $V=\phi(v_0, v_1)$ may assign $v_1$ to v in the later iteration. In the example of Algorithm 3, i gets 0 in the first iteration and i+1 in the later iterations at L3.

With the highlighted part, particularly, invoking a sub-operation with an additional memento argument mid.entry at L5, the non-volatile memory object design system may ensure a deterministic replay of a loop body. However, the loop-dependent variable i makes it difficult to correctly recover from a crash since the non-volatile memory object design system needs to restore a value of i in the last iteration.

The non-volatile memory object design system may support loop-carried dependence through checkpoint of dependent variables at a loop head. The non-volatile memory object design system may request a programmer to checkpoint dependent variables (e.g., i) at the loop head. In a post-crash execution, a checkpoint operation may retrieve a value of i in the last iteration and may delimit the last iteration. For example, it is assumed that L3 and L5 record timestamps 30 and 20, respectively. Then, the last iteration starts at timestamp 30 and the post-crash execution needs to re-execute L5. Similarly, if L3 and L5 record timestamps 80 and 90, respectively, the last iteration starts at timestamp 80 and the post-crash execution needs to retrieve a sub-operation result recorded in mid.entry at L5.

In the presence of a plurality of dependent variables, the non-volatile memory object design system may request a programmer to merge all the dependent variables into a single tuple or struct and to checkpoint it at once. Otherwise, dependent variables of two consecutive iterations may be mixed. For example, it is assumed that there are two dependent variables, x and y, and they are individually checkpointed. If only x is checkpointed at the loop head and then a thread crashes, the post-crash execution retrieves a value of x from the last iteration and a value of y from a previous iteration, violating recovery correctness.

FIG. 4 is an example for explaining syntax and semantics of core PM language according to an example embodiment.

Hereinafter, a core language is described. A program, p, may include a function environment, δ, and a list of statements, $s_{tid}$, for each thread tid. An assignment statement, r←e where r∈VReg is a register id and e∈Expr is a pure expression, may evaluate e to a value in Val⊆Expr and may assigns it to r. An expression is a constant, a register, an arithmetic/Boolean operation, a tuple/union introduction/elimination, a memento id, an empty expression (E), or a concatenation. A value is an irreducible expression without variables. A load statement, r←pload(e), evaluates e as a PM location, 1∈PLoc≜ N, in shared memory, loads a value of 1 and writes it to r. For simplicity, PM locations may be classified into shared local locations and thread-local locations so that the shared local locations may be used as concurrent DS memory blocks and the thread-local locations may be used as mementos. An allocation, r←palloc(e), initializes a new PM location in the shared memory with a value evaluated from e and writes the location to r.

A conditional statement, if (e) $\vec{s_t}\vec{s_f}$, may reduce to $\vec{s_t}$ or $\vec{s_f}$ depending on a value evaluated from e. A loop explicitly reveals loop-carried dependence in the style of the SSA form. Specifically, loop r e $\vec{s}$ (1) may evaluate an initial value from e and assign it to the dependent variable r; (2) may execute the body $\vec{s}$; (3) in doing so, if continue e is executed, the (merged) loop-carried dependent value evaluated from e may be assigned to r and $\vec{s}$ may be re-executed for the next iteration; and (4) if break is executed, the loop may be terminated. A function call, r←f($\vec{e}$), may evaluate the arguments $\vec{e}$, may find the function id f in the program's function environment δ with $\delta(f)=(\overrightarrow{prms}, \vec{s_f})\in\overrightarrow{VReg}\times\overrightarrow{Stmt}$, and may execute the function body $\vec{s_f}$ with a new variable context assigning the evaluated arguments to $\overrightarrow{prms}$. If return e is executed, control may return to a caller and a return value evaluated from e may be assigned to r.

The non-volatile memory object design system may implement language constructs of primitive detectable operations on Intel-×86. The primitive detectable operations may include chkpt and pcas. A detectable checkpoint, r←chkpt($\vec{s}$, $e_{mid}$), may evaluate $\vec{s}$ as if it is a function body, but may use the same variable context as an operation's caller as a variable-capturing closer. The non-volatile memory object design system, a detectable CAS, r←pcas($e_l$, $e_o$, $e_n$, $e_{mid}$), may evaluate expressions respectively to $v_l$, $v_o$, and $v_n$, may attempt to automatically update a PM location $v_l$ from $v_o$ to $v_n$, and may write whether it succeeded to r. For both chkpt and pcas, their results and timestamps are checkpointed at a thread's sub-memento (located in its private PM) identified by a memento id(mid) from $e_{mid}$.

A thread may include statements ($\vec{s}$), loop and function continuations ($\vec{c}$, definition omitted), volatile state (ts), and persistent memento (mmts). Continuations may be pushed or popped for loop and call (resp. break and return) statements, respectively. A thread state, ts, may include a register file (ts.regs) and the thread's last observed timestamp (ts.time). To maintain its invariant, ts.time may be initialized with zero at a thread initialization point (see machine-crash below), and incremented when a primitive operation is executed or replayed. When executing a primitive operation op, ts.time may be compared with a timestamp $t_{mmt}$ checkpointed in a memento of op. If ts.time<$t_{mmt}$, op is executed before the crash, and thus ts.time is simply updated with $t_{mmt}$; otherwise, the replay may be terminated and op may be executed and ts.time may be updated with a new timestamp. A memento is a map from memento ids (list of labels) to primitive mementos that record values and timestamps. For example, the id list.pnb denotes the primitive memento used at L3 in Algorithm 2. The non-volatile memory object design system may statically infer a structure and a size of a memento for each operation with a type. Lastly, a machine, M, may include a list of threads (T) and a memory (Mem).

A judgement of a form $$\vec{s_1}, \vec{c_1}, ts_1, mmts_1 \xrightarrow{tr}_{\delta} \vec{s_2}, \vec{c_2}, ts_2, mmts_2$$

represents a thread transition for environment δ that emits a trace tr. The trace is a list of events. An event is read (R(1, v), reading v from shared PM location 1) or update (U (l, $v_{old}$, $v_{new}$), automatically updating l from $v_{old}$ to $v_{new}$). In the case of the read event, a value read from the shared memory may be constrained not by thread transition but by memory transition of the form $$mem_1 \xrightarrow{tr} mem_2.$$

Two transitions may be combined into a machine transition of the form $$M_1 \xrightarrow{tr}_p M_2$$

for the program p. According to a machine-step rule, a thread may execute a step ($tr|_U$) of transitioning memory with the same trace tr and emitting only updates externally. The machine-crash states that a thread may crash and re-execute initial statements with an empty continuation, an initial thread state, and a preserved memento.

FIG. 5 is an example for explaining a type system for a deterministic replay and a detectable operation according to an example embodiment.

A program rule states that a program is input if a function environment of the program and statements of each thread are input. A judgment of the form ⊢ δ:Δ denotes that for each function id f, function δ(f) is detectable with Δ(f)∈FnType. A function type is RO indicating that the function only reads from a shared PM location and does not access a memento at all; or RW indicating that the function reads and writes to a shared PM location and accesses only a memento prefixed by mid given as its last argument. The ENV-EMPTY rule states that an empty function environment is input; ENV-RO adds a read-only function to the environment; and ENV-RW adds a read-write function with the last parameter being the memento id mid. A judgement Δ⊢ labs $\vec{s}$ in the premise of ENV-RW states that for any function environment (δ) with type Δ, an execution of $\vec{s}$ satisfies an interpretation of RW while using only those sub-mementos prefixed by mid.lab for some lab∈labs.

In the case of read/write function, EMPTY indicates that an empty statement list is input for any function environment type (Δ) using no memento (∅). ASSIGN, CONTINUE, BREAK, and RETURN indicate that so are assignment, continue, break, and return statements for all subexpressions as they are pure. SEQ may compose an instruction list that uses disjoint memento ($labs_l \cap labs_r = \emptyset$) and sequential composition uses a disjoint union ($labs_l \uplus labs_r$). IF-THEN-ELSE may compose a conditional branch without requiring disjoint since only one branch is executed.

The CAS rule may specify that pcas is input against a memento label it uses (lab). CHKPT behaves analogously so long as the checkpoint body ($\vec{s}$)is read-only. The non-volatile memory object design system may immediately verify a result of the body before being assigned to a register for deterministic replay. For example, considered is an execution of Algorithm 2 in which, among prey, next, and blk obtained at L3, only prey is checkpointed before a crash. Then, the post-crash execution may re-calculate new values, prey', next', and blk', and may use old prev from the memento, and may mix results of different executions across crashes using the new values next' and bblk'. This may lead to a bug. Since list traversal is non-deterministic, prev and next' are adjacent to each other, which may break the list invariant LOOP-SIMPLE indicates that a loop without loop-carried dependence is input if a loop body is $(\vec{s})$. Here, a loop-dependent variable "_" indicates that it is written to nowhere or a dependent variable is absent. LOOP states that a loop is input if so is its body, its dependent variable (r) is checkpointed at the loop head, and the checkpoint and body use disjoint memento labels. CALL states that an RW function call is input against the memento label it uses.

The non-volatile memory object design system sketches proof of detectability of an input program and provides a full proof. The non-volatile memory object design system may formulate detectability of the typed, that is, input program. For the program p, event trace tr is referred to as a behavior of p and written $tr \in \mathcal{B}^{\lightning}(p)$, if M, such as $$init(p) \xrightarrow{tr}{}^{*}_{p} M,$$

is present. Here, init (p) denotes an initial machine of p and $$\xrightarrow{tr}{}^{*}_{p}$$

denotes a reflexive transitive closure of machine transition $$\xrightarrow{tr}_{p}$$

with concatenated event traces. Also, tr is a crash-free behavior of p and written tr∈(p) if it is a behavior from a crash-free machine execution using only MACHINE-STEP. Then, the following theorem is provided.

Theorem 3.1 (Detectability):

$$\text{Given a program } p\text{, if } \vdash p \text{ holds, then } \mathcal{B}^{\lightning}(p) \subseteq \mathcal{B}(p).$$

Theorem 3.1 ensures failure transparency in that a crash does not introduce an additional behavior. That is, theorem 3.1 ensures detectable recoverability of typed programs.

FIG. 6 is an example of explaining an operation of proving detectable recoverability by gradually removing a crash. Here, Theorem 3.1 is proved by gradually transforming an arbitrary execution of p into an execution without crashes while preserving a behavior. The non-volatile memory object design system may exploit the fact that each thread interacts with other components only via event traces. As long as event traces are preserved, consecutive executions of a thread across crashes may be locally merged into one without crashes. A resulting machine execution may produce the same behavior as before with fewer crashes. Therefore, the non-volatile memory object design system may perform a crash-free execution with the same behavior.

The non-volatile memory object design system may formulate an operation of locally merging thread executions through Definition 3.2. It is assumed that a thread executes the statements $\vec{s}$ twice before and after a crash. Therefore, statements, continuations, and volatile thread states may be initialized and memento ($mmt_{\omega}$) may be preserved. Then, there is an execution without a crash that results in the same memento ($mmt_{\omega}$) while tr emitting an event trace ($tr_x$) that refines an original event trace ($tr \# \underline{tr}$). The non-volatile memory object design system may reach from $tr \# \underline{tr}$ to $tr_x$ by removing some read events. Trace refinement is sufficient to replace a thread execution in a machine execution while preserving a corresponding behavior since trace refinement system transitions ignore read events and memory transitions are closed under trace refinement.

Definition 3.2 (deterministic replay): Let δ be a function environment and $\vec{s}$ be a list of statements. In the following, $\vec{s}$ is denoted as DR(δ, $\vec{s}$) and deterministically replayed for δ.

$$\forall\, tr, \underline{tr}, \overrightarrow{s_\omega}, \underline{\overrightarrow{s_\omega}}, \overrightarrow{c_\omega}, \underline{\overrightarrow{c_\omega}}, ts, ts_\omega, \underline{ts_\omega}, mmts, mmts_\omega,$$
$$\underline{mmts_\omega}, \vec{s}, [\ ], ts, mmts \xrightarrow{tr}{}^{*}_{\delta} \overrightarrow{s_\omega}, \overrightarrow{c_\omega}, ts_\omega, mmts_\omega \to \vec{s}, [\ ],$$
$$ts, mmts_\omega \xrightarrow{\underline{tr}}{}^{*}_{\delta} \underline{\overrightarrow{s_\omega}}, \underline{\overrightarrow{c_\omega}}, \underline{ts_\omega}, \underline{mmts_\omega} \to \exists\, tr_x, \overrightarrow{s_x}, \overrightarrow{c_x}, ts_x,$$
$$\vec{s}, [\ ], ts, mmts \xrightarrow{tr_x}{}^{*}_{\delta} \overrightarrow{s_x}, \overrightarrow{c_x}, ts_x, \underline{mmts_\omega} \;\wedge\; tr_x \sim tr \# \underline{tr}.$$

Lemma 3.3:

Let δ be an environment, Δ be an environment type, $\vec{s}$ be a list of statements, and labs be a set of labels. If ⊨ δ:Δand Δ⊨labs $\vec{s}$, DR(δ, $\vec{s}$).

This lemma indicates that input statements are deterministically replayed.

In the absence of a crash, a program p behaves equivalently to erasure of p, written erase(p), intuitively corresponding to removing a highlighted part. In particular, memento parameters and arguments are removed, checkpoint operations are removed, and pcas operations are replaced with plain cas operations. Therefore, the following theorem may be derived.

Theorem 3.4 (Erasure)

$$\text{Given a program } p\text{, If } \vdash p \text{ holds, then } \mathcal{B}^{\lightning}(p) \subseteq \mathcal{B}(\text{erase}(p)).$$

Theorem 3.4 effectively reduces the complexity of designing a detectable and persistent data structure (DS) to that of designing a volatile DS and adapting the volatile DS to a type system proposed in an example embodiment. In particular, a programmer no longer needs to write a challenging-to-develop and reason-about DS-specific recovery code, which is required by most hand-tuned persistent DSs.

The non-volatile memory object design system may be implemented on Intel-×86 to show feasibility and practicality of core language. A PM primitive may use an app direct mode of Intel-×86 Optane DCPMM to access PM locations with a byte addressability function through load, store, and CAS instructions. The non-volatile memory object design system may use a clwb instruction to ensure write to a PM location is persistent. Store or CAS to a PM cache line cl is guaranteed to be persisted if followed by clwb cl and then sfence, mfence, or successful CAS.

The non-volatile memory object design system may install a crash handler that continuously observes and handles a crash to emulate machine-crash. (1) When a thread crashes, which may happen due to signals but not is widely considered, the crash handler may create a new thread that executes initial statements of an original thread. Also, the crash handler may initialize a thread state (ts), such as setting ts.time to zero, and runtime resources, such as reclamation handling. (2) When the whole system crashes, a post-crash execution first executes the crash handler, which then initializes a system state as if every thread experiences just a thread crash instead of a system crash. Specifically, the crash handler performs Ralloc's garbage collection, initializes volatile data used by primitive operations, and revives a thread.

The core language assumes a consistent clock for a plurality of threads across crashes. The non-volatile memory object design system may design such a clock on Intel-×86 using rdtscp instruction that generates a hardware timestamp. A hardware clock is consistent for a single thread. Here, strictly increasing and serializing in that rdtscp followed by lfence is not reordered with surrounding instructions.

However, it is observed in the art that the clock is not consistent for the plurality of threads across crashes as follows. (1) The clock is reset to zero when a machine is rebooted after a crash. (2) The clock has an inter-core skew due to misaligned delivery of a RESET signal at system boot. Therefore, although the rdtscp instruction happens before another case in a different thread, their timestamps may not be ordered. Still, the skew is invariant, that is, constant regardless of dynamic frequency and voltage scaling. For core language, such caveats may be solved as follows For the skew, the non-volatile memory object design system may relax synchronization criteria of clock. The non-volatile memory object design system may measure maximum pair-wise inter-core skew, $O_g$ . Then, the following observation may be made.

Observation 1 (weak global synchronization). It is assumed that a and b are rdtscp; lfence instruction sequences. In the case of one of $$a \overset{po}{\rightarrow} b$$

(single-thread program order) and $$a \overset{Hb}{\rightarrow} \text{wait}(O_g) \overset{Hb}{\rightarrow} b$$

(multi-thread happens-before), a timestamp of a is less than that of b.

Here, wait($O_g$) denotes a spin loop to provide a sufficient margin for clock skew. Conditions for the single-thread program order and the multi-thread happens-before order may be used in implementation of checkpoint and CAS operations, respectively.

The single-thread program order may sufficiently separate two rdtscp instructions although a thread is context-switched in-between. Although the thread switches to a core with a negative timestamp offset, its effect bounded by $O_g$ (60 ns at the maximum in evaluation) may be subsumed by context switch latency (2-5 μs at the minimum). Similarly, for the multi-thread happens-before condition, $O_g$ sufficiently separates two rdtscp instructions regardless of their executed cores because $O_g$ is the maximum inter-core skew.

The chkpt operation of the core language may be implemented on Intel-×86. The non-volatile memory object design system may ensure the atomicity of chkpt (i.e., one never observes a partially checkpointed value) by double buffering. While a buffer is being written, the other buffer holds a valid value. Also, the non-volatile memory object design system may record timestamps and values in PM to deterministically replay control flow FIG. 7 is an example for explaining detectable checkpoint according to an example embodiment.

To atomically update a timestamped value in an abstract memento, concrete implementation uses two timestamped values, that is, an old value (stale) and a latest value (latest). An old timestamp (st) and a latest time stamp (lt) are distinguished by comparing two timestamps (st and lt) of a given memento (L2-L5) (1). If a timestamp ($t_{mmt}$) of the memento is greater than a replaying timestamp (ts.time) of a thread, an operation is already performed (2). In this case, ts.time is initially incremented to $t_{mmt}$ and then a pre-crash result is replayed by simply returning an old returned value (L6-L10). A result of given statements is written to a stale buffer of the memento (L12) (3). Unless the memento fits in a cache line, the stale buffer is flushed so that the buffer is flushed at L18, following optimization technique (L14) (4). An existing timestamp is updated to a current timestamp (L17) and flushed (L18), and ts.time is updated (L19), and the result is returned (L20) (5). Here, "flushopt l" is a shorthand for performing clwb cl on all cache lines that span a location l.

The pcas operation of core language may be implemented on Intel-×86. The pcas on the location l may include three phases of locking l with an architecture-provided plain CAS, committing the operation with PM writes, and unlocking l with another plain CAS. If a thread observes a locked location, it helps an ongoing operation to guarantee lock freedom. When helping, it is important to notify such a fact to a thread being helped to ensure a deterministic replay. Otherwise, in the case that a thread performs a locking CAS, crashes, and is helped, the thread may incorrectly perform the same CAS (that is already performed by a helper) again in a post-crash execution. While a helping mechanism requires an array of O($T^2$) (resp. O(T)) sequence numbers in PM for each location (in which T denotes the number of threads), space consumption in PM decreases to 8 bytes per location. The key idea is to compare timestamps with loops.

An 8-byte location may include a 1-bit parity for helping, a 1-bit helping flag to prevent ABA, an 8-bit thread ID (0 reserved for a pcas algorithm and 1-255 usable), and a 54-bit address annotated with a user tag (64 TB with an 8-bit tag or 256 GB with a 16-bit tag). The tag is reserved for a user to annotate an arbitrary bit to a pointer value for correctness or optimization. It is assumed that each of encoding and decoding functions converts a (parity, thread ID, offset) tuple to a location and vice versa.

Similar to a chkpt operation, pcas may ensure atomicity through double buffering by storing two copies of a value and an annotated timestamp in implementation of a primitive memento. A 62-bit timestamp generated from rdtscp (sufficient for about 47 years without overflow) is annotated with a 1-bit parity and a 1-bit success flag, forming 8 bytes in total. It is assumed that ENCODET and DECODET convert a (parity, success flag, timestamp) tuple into an annotated timestamp and vice versa.

For helping, the non-volatile memory object design system may track several timestamps in dynamic random access memory (DRAM) and PM. The ts.cas timestamp in DRAM records a parity-annotated timestamp of each thread's last CAS operation across crashes, while the global array HELP[2][T] in PM records a timestamp of last helping for each parity and thread, written by a helper. The non-volatile memory object design system may maintain the invariant that CAS of a thread is helped if ts.cas is less than HELPlplitsl for some appropriate parity p (see below).

The crash handler initializes ts.cas with a maximum timestamp checkpointed in pcas primitive mementos when a thread crashes and uses HELP to calculate $t_{max}$ for clock calibration when a system crashes.

FIG. 8A-B is an example for explaining an operation of implementing pcas according to an example embodiment.

As pcas acquires a lock by temporarily tagging a parity, a success flag, and a thread ID to a location value in PM, pload that helps the ongoing pcas to release the lock may be implemented, ensuring it reads a value persisted in PM. Specifically, LOAD (L1) may perform an architecture-provided plain load and may invoke HELP. Therefore, both operations do not recognize tags. Input and output location values may be tagged with zero.

The pcas operation (L5) starts by identifying stale and latest values in a memento (L9). (1) Then, whether a CAS operation is completed or suspended during previous execution with the latest value in the memento is determined. When the CAS operation is completed, a previous result value may be returned (L12-L27). (2) Otherwise, an actual CAS operation may be executed (L28-L52). For easier understanding, a second task is initially described.

The CAS operation tries to lock a location by performing a plain CAS to a new value annotated with a next parity ($\neg p_{own}$) and a thread ID (tid) (L30-L34) (1). If unsuccessful, the CAS operation is terminated after updating ts.time and failure is persisted to the memento (L36-L41) (2). The operation is ensured to be committed by flushing the plain CAS (L43) (3). The operation is completed after updating ts.time (L44) and ts.cas (for a nextt CAS operation), persisting success to the memento (L48), attempting to unlock the location by atomically clearing annotations (50), and (regardless of the result), ensuring that write to the memento is flushed (L51).

To demonstrate that the execution of pcas is deterministically replayed, the following events of a pre-crash execution may be initially defined. Commit relates to a flush of a first plain CAS at L30. This event does not coincide with a flush instruction at L43 since write may be voluntarily flushed before requested. Checkpoint relates to a flush of memento write at L39 and L47. Unlock relates to a flush of a second plain CAS at L50. Based on a timing of a crash, a memory state that may be observed during a post-crash execution may be categorized as follows:

(⚡1) Before commit: The latest timestamp in the memento ($t_{mmt}$) is less than or equal to the last observed timestamp of the tread (ts.time).

(⚡2) Between commit and checkpoint: $t_{mmt}$ is still less than or equal to ts.time. A location (loc) has one of two states. For example, (⚡2a) loc is still locked by the thread or (⚡2b) loc is not locked by the thread as it is unlocked by helping of another thread.

(⚡3) After checkpoint: $t_{mmt}$ is greater than ts.time.

The replay algorithm (L12-L27) exhaustively covers all the crash cases described above. After decoding the annotated timestamp of the memento (L11), $t_{mmt}$ and ts.time may be compared. If $t_{mmt}$ is greater than ts.time (, which corresponds to ⚡3), the pre-crash execution may be replayed. ts.time may be updated and if pcas is successful, true and old may be returned (L14). Otherwise, false and a value stored in the memento may be returned (L16). If $t_{mmt}$ is less than or equal to ts.time, it helps the location's ongoing pcas (L18), which may transition sub-case ⚡2a to ⚡2b. To distinguish between cases ⚡1 and ⚡2b, the last timestamp increased by the helper and the timestamp of the last CAS operation of the thread need to be compared. To this end, ts.cas may be decoded, a parity and a timestamp ($t_{own}$) may be retrieved, and a helping timestamp ($t_{help}$) may be loaded using an opposite parity (L19-L20) (see below for details of parity and timestamp on helping). If $t_{help}$ is greater than $t_{own}$ (corresponding to ⚡2b), it detects (from the invariant of ts.cas and HELP) that the last CAS operation actually succeeded and completes the operation (L21-L27). Otherwise (corresponding to ⚡1), it may proceed to a normal execution (L28-L52).

For lock-freedom progress, a thread may invoke $H_{ELP}$ (loc, old) (L54) for loc's ongoing pcas operation to be flushed, may unlock the same, and may return an unlocked (i.e., untagged) location value. If it is already unlocked, a given value, old, read from loc may be returned (L56) (1). $O_g$ may be waited for, a current timestamp (t) may be read, and $O_g$ may be waited for again to make t synchronized across other threads (L57-L59, see Observation 1) (2). A value, called cur, may be loaded again from loc and if old ≠cur, a process from L55 may be retried (L61) (3). The ongoing operation is ensured to be committed through flushing (L62) (4). A helping descriptor flag may be registered to prevent ABA (L63-L68) (5). HELP[$para_{old}$][$tid_{old}$], a timestamp of the last CAS help for parity and thread ID annotated in old, may be loaded (6). if it is bigger than t, the operation may be retried (L69-L72). A plain CAS may be performed and flush on HELP[$para_{old}$][$tid_{old}$] may be performed (7). A try to unlock a location with a plain CAS and a flush may be made, and if unsuccessful, the operation may be retried (L78-L82) (8). The unlocked location may be returned (L83) (9).

For the deterministic replay, if and only if a previous execution of pcas crashes between commit and checkpoint of success (⚡2), $H_{ELP}$( ) updates HELP for a re-execution of pcas to enter a branch at L21. To this end, it is sufficient to prove the following.

Lemma 4.1: Let $p_n$ and $t_n$ denote a parity and a timestamp of $n^{th}$ pcas invocation of tid. Then, a sequence {$p_i$} alternates between even and odd numbers and a sequence {ti} strictly increases. Then, if and only if one of the $n^{th}$ and a later CAS with the parity $p_n$ is helped, $t_{n-1}$<HELP[$p_n$][tid].

Figure 9:
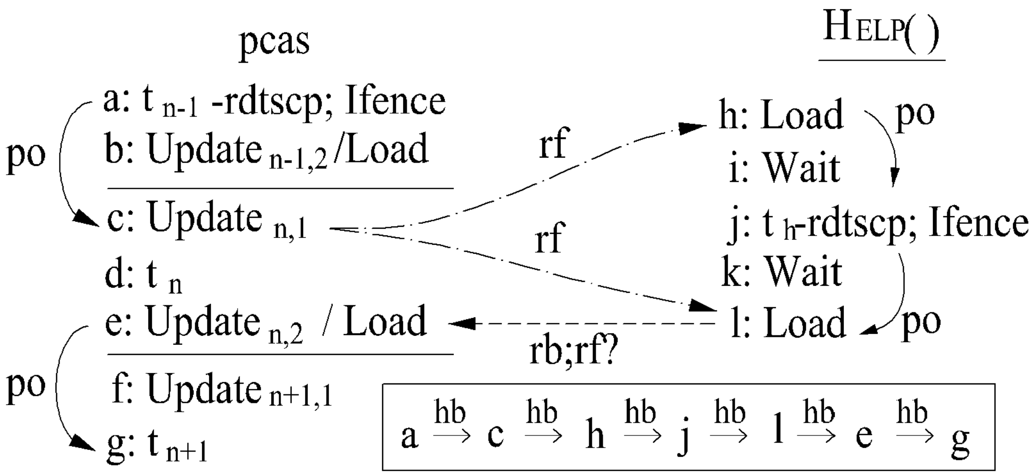
FIG. 9 is an example for an instruction synchronization operation of pcas( ) and $H_{ELP}$( ) according to an example embodiment.

Proof: As shown in FIG. 9, it is assumed that a HELP operation generates a timestamp $t_h$ at L58 and tries to help a second plain CAS of the $n^{th}$ CAS invocation of tid. Here, the plain CAS and timestamp generation from $(n-1)^{st}$ to $(n+1)^{st}$ CAS invocations of tid and loading and timestamp generation of HELP invocation are described. Here, $Update_{n,i}$ represents an $i^{th}$ plain CAS of the $n^{th}$ CAS of tid and Load represents a load from a location. Then, the following properties may be found from Observation 1:

$$t_{n-1} < t_h \text{ from } a \xrightarrow{po} c \xrightarrow{rf} h \xrightarrow{po} i \xrightarrow{po} j\text{; and} \tag{1}$$

$$t_h < t_{n+1} \text{ from } j \xrightarrow{po} k \xrightarrow{po} l \xrightarrow{rb;rf^?} e \xrightarrow{po} g \tag{2}$$

Here, po denotes program order, rf denotes reads-from relation from each write to its readers, rb denotes reads-before relation from each read to later writes, $rb;rf^?$ denotes reads-before relation possibly followed by reads-from relation, and all relations constitute happens-before relation hb in ×86-TSO memory model.

It needs be recalled that HELP persists $Update_{n,1}$ (L62), atomically increases HELP[pn][tid] to $t_h$ (L73-L77), and helps $Update_{n,2}$ (L78-L82). If the $n^{th}$ CAS of tid is helped, $t_{n-1}<t_h\leq$HELP[pn][tid] may be obtained due to property (1). Conversely, if $t_{n-1}<$HELP[pn][tid], it may not be the result of help for $(n-2)^{nd}$ or earlier CAS or those with parity $\neg p_n$ due to property (2).

As primitive detectable operations, Chkpt-mmt: chkpt, CAS-mmt: pcas, Indel-mmt: insertion/deletion for atomic locations that performs fewer flushes than pcas may be implemented. Accordingly, core language is extended to support additional primitive operations, including Vol-mmt that is a volatile location for a cached value requiring no flushes and Comb-mmt (adaption of a general combiner for persistent data structure to the proposed framework). While an original combiner is detectable, it only supports a single invocation of each operation by each thread. For example, the following statements are not detectably recoverable:

$$v_1 \leftarrow DEQUEUE(q);\ v_2 \leftarrow DEQUEUE(q);\ ENQUEUE(q, v_1 + v_2) \quad 1$$

If an execution is suspended while performing DEQUEUE, whether it is for $v_1$ or $v_2$ may not be detected. In contrast, the non-volatile memory object design system may distinguish two invocations by distinct sub-mementos.

Using a primitive element and a type system, the non-volatile memory object design system may implement the following detectable, persistent DSs, including List-mmt: CAS-based lock-free linked-list; TreiberS-mmt: CAS-based Treiber stack; MSQ-mmt-O0: CAS-based Michael-Scott queue; MSQ-mmt-O1: Michael-Scott queue based on Indel-mmt and Vol-mmt; CombQ-mmt: combining queue based on Comb-mmt; and Clevel-mmt: CAS-based lock-free resizing hash table. It optimizes an advanced type rule, LOOP TRY. Theorem 3.4 guarantees the detectability of such implementation. In addition, implemented is MSQ-mmt-O2: a variant of MSQ-mmt-O1 with an invariant-based optimization, which reduces PM flushes based on the invariant that specific location values are always persisted.

Figure 10:
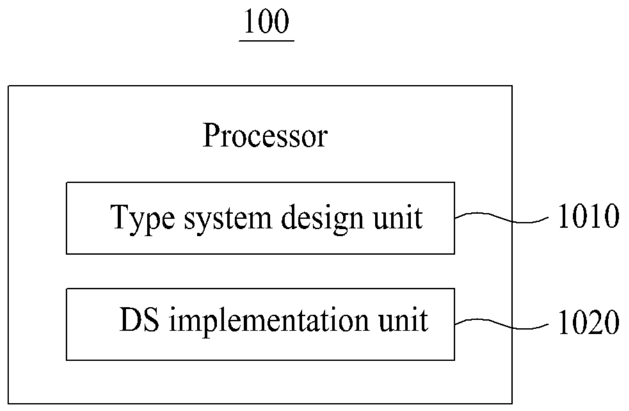
FIG. 10 is a block diagram illustrating a configuration of a non-volatile memory object design system according to an example embodiment.
Figure 11:
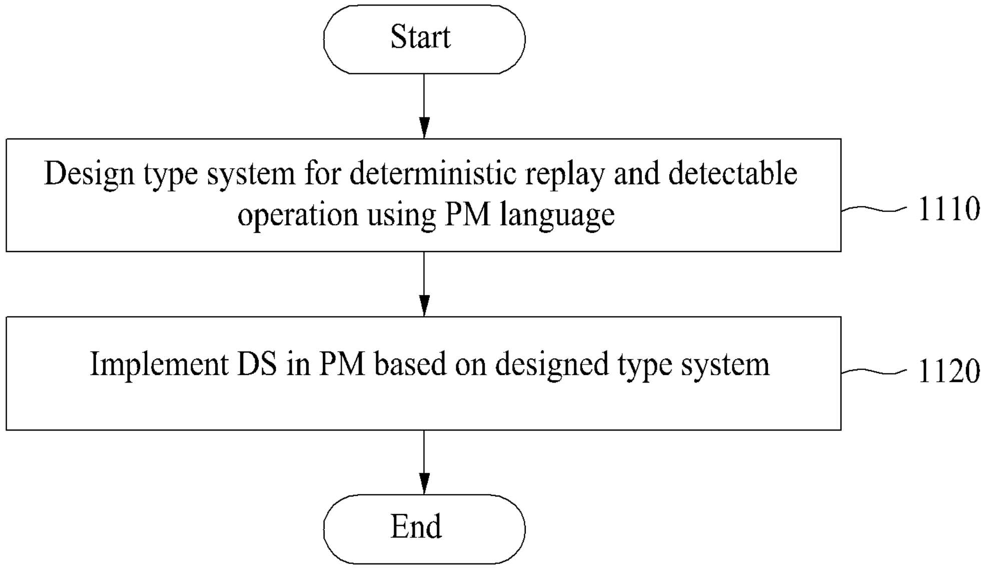
FIG. 11 is a flowchart illustrating an object design method of a non-volatile memory according to an example embodiment.

FIG. 10 is a block diagram illustrating a configuration of a non-volatile memory object design system according to an example embodiment, and FIG. 11 is a flowchart illustrating an object design method of a non-volatile memory according to an example embodiment.

A processor of a non-volatile memory object design system 100 may include a type system design unit 1010 and a data structure (DS) implementation unit 1020. Such components of the processor may be representations of different functions performed by the processor in response to a control instruction provided from a program code stored in the non-volatile memory object design system. The processor and the components of the processor may control the non-volatile memory object design system to perform operations 1110 and 1120 included in the object design method of the non-volatile memory of FIG. 11. Here, the processor and the components of the processor may be configured to execute an instruction according to a code of an OS included in the memory and a code of at least one program.

The processor may load, to the memory, a program code stored in a file of a program for the object design method of the non-volatile memory. For example, in response to execution of the program in the non-volatile memory object design system 100, the processor may control the non-volatile memory object design system 100 to load the program code from the file of the program to the memory under control of the OS. Here, the type system design unit 1010 and the DS implementation unit 1020 may be different functional representations of the processor for executing an instruction of a part corresponding to the program code loaded to the memory to execute operations 1110 and 1120, respectively.

In operation 1110, the type system design unit 1010 may design a type system for a deterministic replay and a detectable operation using a persistent memory (PM) language. The type system design unit 1010 may provide a detectable checkpoint operation that records a result of read-only expression. The type system design unit 1010 may provide a detectable, persistent compare-and-swap (CAS) operation. The type system design unit 1010 may additionally set an operation descriptor for recording a progress status and result of an operation in PM. The type system design unit 1010 may support a loop by efficiently distinguishing results of sub-operations from different iterations using timestamps and recording an operation progress status. The type system design unit 1010 may support loop-carried dependence through checkpoint of dependent variables at a loop head. If a plurality of dependent variables is present at a loop head, the type system design unit 1010 may merge all the variables into a single tuple or struct and may checkpoint the same at once.

In operation 1120, the DS implementation unit 1020 may implement a DS in PM based on the designed type system. The DS implementation unit 1020 may access PM locations with byte addressability through load, store, and CAS instructions. The DS implementation unit 1020 may implement a DS of PM by adjusting a DS of volatile memory based on the designed type system.

In certain embodiments, the DS implementation unit modifies one or more data structures stored in byte-addressable persistent memory (PM) locations, and causes updated values or outcomes to be durably persisted by issuing a clwb instruction followed by a sfence, mfence, or successful CAS, thereby ensuring that writes to PM survive a system crash. The byte-addressable nature of the PM locations may enable the non-volatile memory object design system to access and modify individual data elements through load, store, and CAS instructions, and upon a restart, the system causes a deterministic replay of the last operation by retrieving results recorded durably in the memento prior to the crash.

The apparatuses described herein may be implemented using hardware components, software components, and/or combination of the hardware components and the software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the example embodiments may be recorded in non-transitory computer-readable media including program instructions to implement various operations embodied by a computer. Also, the media may include, alone or in combination with the program instructions, data files, data structures, and the like. Program instructions stored in the media may be those specially designed and constructed for the example embodiments, or they may be well-known and available to those having skill in the computer software arts. Examples of non-transitory computer-readable media include magnetic media such as hard disks, floppy disks, and magnetic tapes; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An object design method of a non-volatile memory performed by a non-volatile memory object design system comprising at least one processor and persistent memory (PM) hardware, the method comprising:

designing a type system for a deterministic replay and a detectable operation using persistent memory (PM) language; and implementing a data structure (DS) of the PM based on the designed type system;

wherein the designing comprises providing a detectable, persistent compare-and-swap (CAS) operation, and the CAS operation compares a current value of loc against $v_{old}$ and if the values match, updates the value of loc to $v_{new}$, and if the values do not match, does not change the current value of loc, and the CAS operation modifies a byte-addressable persistent memory location using a hardware atomic instruction, causes a state transition of the implemented data structure that is durably recorded in the non-volatile memory, and is individually recoverable such that the CAS operation records an outcome of the compare-and-swap in persistent storage and, upon re-execution after a system restart, determines whether it previously completed and, if so, returns the previously recorded outcome without re-executing the compare-and-swap to enable deterministic replay after a system restart.

2. The method of claim 1, wherein the designing comprises providing a detectable checkpoint operation that records a result of read-only expression, and the checkpoint operation verifies whether a value is recorded in a memento mid and if the value is not recorded in the memento mid, records a result obtained by executing the read-only expression in the memento mid and returns the result.

3. The method of claim 1, wherein the designing comprises additionally setting an operation descriptor that records a progress status and result of an operation in the PM.

4. The method of claim 1, wherein the designing comprises supporting a loop by efficiently distinguishing results of sub-operation from different iterations using timestamps and by recording an operation progress status.

5. The method of claim 1, wherein the designing comprises supporting loop-carried dependence through checkpoint of dependent variables at a loop head, and in a case of presence of multiple dependent variables at the loop head, merging all the variables into a single tuple or struct and checkpointing the single tuple or struct at once.

6. The method of claim 1, wherein the implementing comprises accessing PM locations with byte addressability through load, store, and CAS instructions.

7. The method of claim 1, wherein the implementing comprises implementing in a DS of PM by adjusting a DS of volatile memory based on the designed type system, and the DS of the PM includes a CAS-based lock-free linked-list, a CAS-based Treiber stack, CAS-based Michael-Scott queue, Michael-Scott queue based on Indel-mmt and Vol-mmt, combining queue based on Comb-mmt, and a CAS-based lock-free resizing hash table.

8. A non-transitory computer-readable recording medium storing instructions that, when executed by a processor, cause the processor to execute an object design method of a non-volatile memory performed by a non-volatile memory object design system, wherein the object design method comprises:

designing a type system for a deterministic replay and a detectable operation using persistent memory (PM) language; and implementing a data structure (DS) of the PM based on the designed type system;

wherein the designing comprises providing a detectable, persistent compare-and-swap (CAS) operation, and the CAS operation compares a current value of loc against $v_{old}$ and if the values match, updates the value of loc to $v_{new}$, and if the values do not match, does not change the current value of loc, and the CAS operation modifies a byte-addressable persistent memory location using a hardware atomic instruction, causes a state transition of the implemented data structure that is durably recorded in the non-volatile memory, and is individually recoverable such that the CAS operation records an outcome of the compare-and-swap in persistent storage and, upon re-execution after a system restart, determines whether it previously completed and, if so, returns the previously recorded outcome without re-executing the compare-and-swap to enable deterministic replay after a system restart.

9. A non-volatile memory object design system comprising:

a type system design unit configured to design a type system for a deterministic replay and a detectable operation using persistent memory (PM) language; and a data structure (DS) implementation unit configured to implement a DS of the PM based on the designed type system;

wherein the designing comprises providing a detectable, persistent compare-and-swap (CAS) operation, and the CAS operation compares a current value of loc against $v_{old}$ and if the values match, updates the value of loc to $v_{new}$, and if the values do not match, does not change the current value of loc, and the CAS operation modifies a byte-addressable persistent memory location using a hardware atomic instruction, causes a state transition of the implemented data structure that is durably recorded in the non-volatile memory, and is individually recoverable such that the CAS operation records an outcome of the compare-and-swap in persistent storage and, upon re-execution after a system restart, determines whether it previously completed and, if so, returns the previously recorded outcome without re-executing the compare-and-swap to enable deterministic replay after a system restart.

* * * * *